US012604863B1

(12) United States Patent
Gauley

(10) Patent No.: US 12,604,863 B1
(45) Date of Patent: Apr. 21, 2026

(54) DOG TUG APPARATUS FOR DISPENSING FOOD ITEMS

(71) Applicant: Gauley Creations Ltd., Calgary (CA)

(72) Inventor: Ryan Gauley, Calgary (CA)

( * ) Notice: Subject to any disclaimer, the term of this patent is extended or adjusted under 35 U.S.C. 154(b) by 0 days.

(21) Appl. No.: 18/957,951

(22) Filed: Nov. 25, 2024

(51) Int. Cl.
*A01K 5/01* (2006.01)

(52) U.S. Cl.
CPC .................................. *A01K 5/0114* (2013.01)

(58) Field of Classification Search
CPC .. A01K 5/0114; A01K 5/0142; A01K 5/0135; A01K 5/0128; A63H 3/005; A63H 15/04; A63H 15/06; A63H 17/05; A63H 2017/055; A63H 17/06; A63H 17/08; A63H 17/10; A63H 17/12
See application file for complete search history.

(56) References Cited

U.S. PATENT DOCUMENTS

| | | | | |
|---|---|---|---|---|
| 1,244,457 | A | * | 10/1917 | Bain ...................... A63F 7/3622 |
| | | | | 446/173 |
| 1,518,144 | A | * | 12/1924 | Huggins ................ A63H 29/12 |
| | | | | 446/167 |
| 1,631,778 | A | * | 6/1927 | Williams ............. A01K 39/012 |
| | | | | 119/70 |
| 2,698,598 | A | | 1/1955 | Hadley |
| 3,900,134 | A | * | 8/1975 | Larson ................. A01G 27/001 |
| | | | | 47/79 |
| 4,203,795 | A | * | 5/1980 | Pupp ...................... B29C 48/08 |
| | | | | 156/218 |

| | | | | |
|---|---|---|---|---|
| 4,432,472 | A | * | 2/1984 | Lamm ................. A47L 11/4083 |
| | | | | 222/174 |
| 4,712,968 | A | * | 12/1987 | Manning ................. E02F 3/427 |
| | | | | 446/427 |
| 5,111,771 | A | | 5/1992 | Mathews |
| 5,634,436 | A | | 6/1997 | Coombs |
| 5,713,307 | A | | 2/1998 | Polston et al. |
| 8,371,249 | B1 | | 2/2013 | Little |
| 8,608,527 | B2 | * | 12/2013 | O'Connor .............. A63H 18/02 |
| | | | | 248/231.91 |
| 9,877,462 | B2 | * | 1/2018 | Taneja ................. A01K 5/0291 |
| 10,925,255 | B1 | * | 2/2021 | Brown ............... F16M 11/2021 |
| 11,266,121 | B2 | | 3/2022 | Rowe et al. |
| 11,981,473 | B2 | * | 5/2024 | Procyshyn ............... B25J 11/00 |
| 2011/0308477 | A1 | | 12/2011 | Khan |
| 2014/0174367 | A1 | * | 6/2014 | Fama ....................... A01K 5/00 |
| | | | | 119/51.01 |
| 2015/0239616 | A1 | * | 8/2015 | Henry .................... A47G 19/06 |
| | | | | 220/751 |

(Continued)

*Primary Examiner* — Ebony E Evans
(74) *Attorney, Agent, or Firm* — Lewellyn Law, PLLC; Stephen Lewellyn

(57) ABSTRACT

An interactive dog tug apparatus for dispensing food items has a tug arm. Rotating the tug arm around a first axis of rotation from a resting position to a tugged position causes a jar assembly to rotate about a second axis from an upright position to an at least partially inverted position. This motion causes food items held by the jar assembly to move into a position for dispensing. Then rotation of the tug arm around the first axis from the tugged position back to the resting position causes the jar assembly to rotate back into the upright position. The motion of the jar assembly rotating from the at least partially inverted position to the upright position dispenses the food items that were moved in position for dispensing.

18 Claims, 14 Drawing Sheets

(56) References Cited

U.S. PATENT DOCUMENTS

| | | | |
|---|---|---|---|
| 2016/0037748 A1* | 2/2016 | Taneja | ................ A01K 5/0114 |
| | | | 119/51.01 |
| 2018/0103615 A1 | 4/2018 | Meade | |
| 2021/0204510 A1* | 7/2021 | Bonczar | .............. A01K 5/0114 |

* cited by examiner

DOG TUG APPARATUS FOR DISPENSING FOOD ITEMS

FIELD OF THE INVENTION

The present invention generally relates to the field of animal husbandry and, more particularly, to a mechanical dog tug apparatus for dispensing food items.

BACKGROUND OF THE INVENTION

Dog interactive feeding devices are tools designed to engage dogs mentally and physically. These devices typically incorporate puzzles, mazes, or slow-release mechanisms that require the dog to work for their food, simulating natural foraging behavior. Additionally, they serve as enrichment tools, providing mental stimulation that can alleviate boredom, reduce anxiety, and deter destructive behavior, especially for dogs that spend a lot of time indoors.

SUMMARY OF THE INVENTION

The present disclosure provides a new and innovative interactive feeding device for feeding animals, such as dogs. The present interactive feeding device is a mechanical dog tug apparatus that dispenses food when a dog pulls on it. To release food, the dog must exert a specific amount of effort, which the user can adjust. Once set, the required effort remains consistent, ensuring the dog must apply the same force each time to receive food.

In an example, the apparatus has a tug assembly. The tug assembly has a tug arm, and the tug arm has a first end, a second end, and a length extending between the first and second ends. The first end of the tug arm is supported to pivot around a first axis between a resting position in a first rotational location about the first axis and a tugged position in a second rotational location about the first axis. The tug assembly further as a jar assembly that is coupled an extension arm of the tug arm to pivot relative to the extension arm around a second axis and a linkage connected to the jar assembly. Rotation of the tug arm around the first axis from the resting position to the tugged position causes the jar assembly to rotate about the second axis from an upright position to an at least partially inverted position causing food items held by the jar assembly to move into position for dispensing. Then rotation of the tug arm around the first axis from the tugged position back to the resting position causes the jar assembly to rotate back into the upright position. The motion of the jar assembly rotating from the at least partially inverted position to the upright position dispenses the food items that were moved in position for dispensing.

In aspects, the jar assembly has a jar lid, a jar, a scoop, and a scatter scoop. The jar lid is coupled to the extension arm and to the linkage. The jar is removably connected to the jar lid. The scoop is connected to the jar lid at an aperture through the jar lid and the scatter scoop is connected to the scoop. The scoop and the scatter scoop define a channel that is connected at one end to the aperture and that is open at is opposite end. In aspects, differently sized scoops may be provided to control the amount of food items that are dispensed and/or for use with differently sized food items.

In aspects, the scatter scoop may have a conically shaped surface and the conically shaped surface may be disposed near the opposite end of the channel with the apex of the conically shaped surface facing the opposite end of the channel. The conically shaped surface helps to randomly disperse food items in the space around the apparatus.

In another example, the apparatus has a tug assembly. The tug assembly has support bracket and a tug arm. The tug arm has a first end, a second end, and a length extending between the first and second ends. First end is coupled to the support bracket to pivot relative to the support bracket around a first axis between a resting position in a first rotational location about the first axis and a tugged position in a second rotational location about the first axis. The tug assembly further as a jar assembly. The jar assembly is coupled to an extension arm of the tug arm to pivot relative to the extension arm around a second axis. One or more jar arms has a first end coupled to the support bracket to pivot relative to the support bracket and a second end coupled to the jar assembly to pivot relative to the jar assembly. One or more gas springs has a first end coupled to the support bracket to pivot relative to the support bracket and a second end coupled to the tug arm to pivot relative to the tug arm. A tug rope is attached to the second end of the tug arm, and pulling on the tug rope rotates the tug arm from the resting position into the tugged position.

In aspects, the one or more gas springs can be replaced or adjust to change to required tug force on the tug rope to move the tug arm from the resting position into the tugged position.

In aspects, rotation of the tug arm around the first axis from the resting position to the tugged position causes the jar assembly to rotate about the second axis from an upright position to an at least partially inverted position causing food items held by the jar assembly to move into position for dispensing. Then rotation of the tug arm around the first axis from the tugged position back to the resting position causes the jar assembly to rotate back into the upright position. The motion of the jar assembly rotating from the at least partially inverted position to the upright position dispenses the food items that were moved in position for dispensing.

In aspects, the jar assembly has a jar lid, a jar, a scoop, and a scatter scoop. The jar lid is coupled to the extension arm and to the linkage. The jar is removably connected to the jar lid. The scoop is connected to the jar lid at an aperture through the jar lid and the scatter scoop is connected to the scoop. The scoop and the scatter scoop define a channel that is connected at one end to the aperture and that is open at is opposite end. In aspects, differently sized scoops may be provided to control the amount of food items that are dispensed and/or for use with differently sized food items.

In aspects, the scatter scoop may have a conically shaped surface and the conically shaped surface may be disposed near the opposite end of the channel with the apex of the conically shaped surface facing the opposite end of the channel. The conically shaped surface helps to randomly disperse food items in the space around the apparatus.

In aspects, the dog tug apparatus may have a mounting bracket and the support bracket may be removably connected to the mounting bracket. The support bracket may have one or more pintles and the mounting bracket may have corresponding one or more gudgeons. The one or more pintles are removably receivable by the one or more gudgeons to removably connect the support bracket to the mounting bracket. The support backet may be pivotal relative to the mounting bracket.

Additional features and advantages of the disclosed apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter, unless stated otherwise.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label. No attempt is made to show structural details of the embodiments in more detail than is necessary for a fundamental understanding of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized, and changes can be made without departing from the scope of the disclosure.

Embodiments of the disclosure provide an interactive dog tug apparatus for dispensing treats by a dog engaging with the apparatus. For the purpose herein, the term treat should be considered to include dry granular or pellet food items. The tug apparatus is mounted to a vertical surface, like a wall, and has a suspend rope-like tug for the dog to grab by its mouth and tug at to operate the apparatus to dispense treats.

Figure 1:
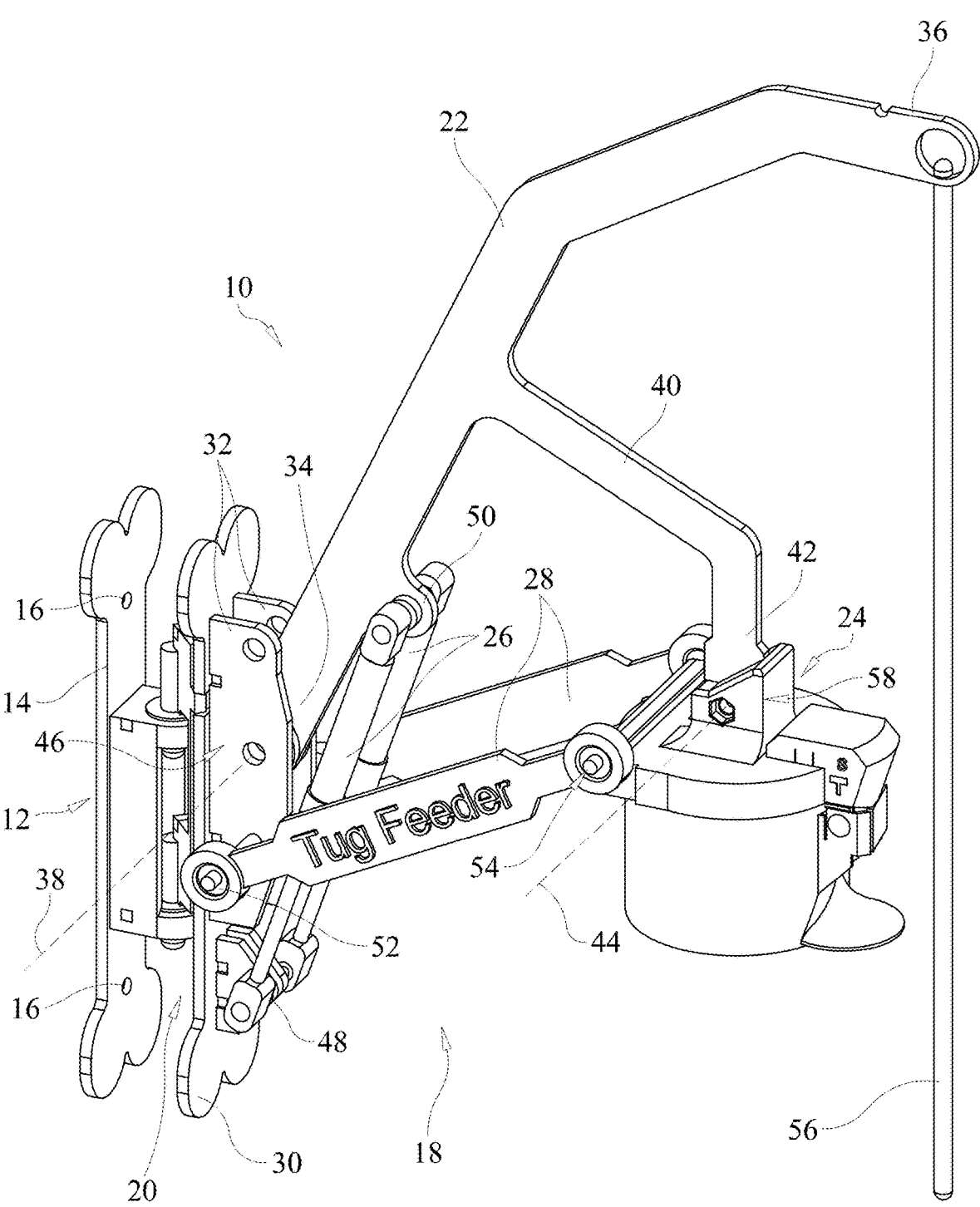
FIG. 1 illustrates a perspective view of a mechanical dog tug apparatus in a resting position, according to an aspect of the present disclosure.

Referring to FIG. 1 of the drawings, there is shown a dog tug apparatus 10 in accordance with an embodiment of the invention. Apparatus 10 has a mounting bracket 12 for the purpose of locating the apparatus in an area for use by a dog. Mounting bracket 12 has a mounting plate 14 that is provided with apertures 16 for the reception of screws or the like, through which the mounting bracket may be mounted at a selected height to a vertical surface, such as a wall.

Apparatus 10 further has a tug arm assembly 18 that may be attached to the mounting bracket 12. Tug arm assembly 18 has a main support bracket 20, a tug arm 22, a jar assembly 24, one or more gas springs 26, and one or more jar arms 28.

Support bracket 20 has a plate 30 having a pair of spaced flanges 32 that extend outwardly from the plate in the same direction therefrom. Tug arm 22 has a first end 34, a second end 36, and a length extending therebetween. Tug arm 22 has an L-shaped formation made along its length, approximately the second end 36, such that the second end is offset a distance from the first end 34. Tug arm 22 has an extension arm 40 that extends outwardly from the length of the tug arm in the offset direction of the second end 36 and terminates at extension arm end 42.

The first end 34 of tug arm 22 is disposed between flanges 32 and is coupled to the flanges at coupling 46 to pivot about axis 38 relative to support bracket 20. As will be discussed in further detail below, jar assembly 24 is coupled to the extension arm 40 at end 42 via coupling 58 to pivot about axis 44 relative to the extension arm. The one or more gas springs 26, representatively two gas springs, are each connected at one end to the support bracket 20 via coupling 48, allowing them to pivot relative to the support bracket. The opposite end of each gas spring is connected to tug arm 22 via coupling 50, allowing it to pivot relative to the tug arm. The one or more jar arms 28, representatively two jar arms, are each connected at one end to the support bracket 20 via coupling 52, allowing them to pivot relative to the support bracket. The opposite end of each jar arm is connected to the jar assembly via coupling 54, allowing it to pivot relative to the jar assembly.

A tug rope or tether 56 is connected at one end to end 36 of tug arm 22, while the other end remains free, allowing a dog to grasp and pull on the rope with its jaws.

Figure 2:
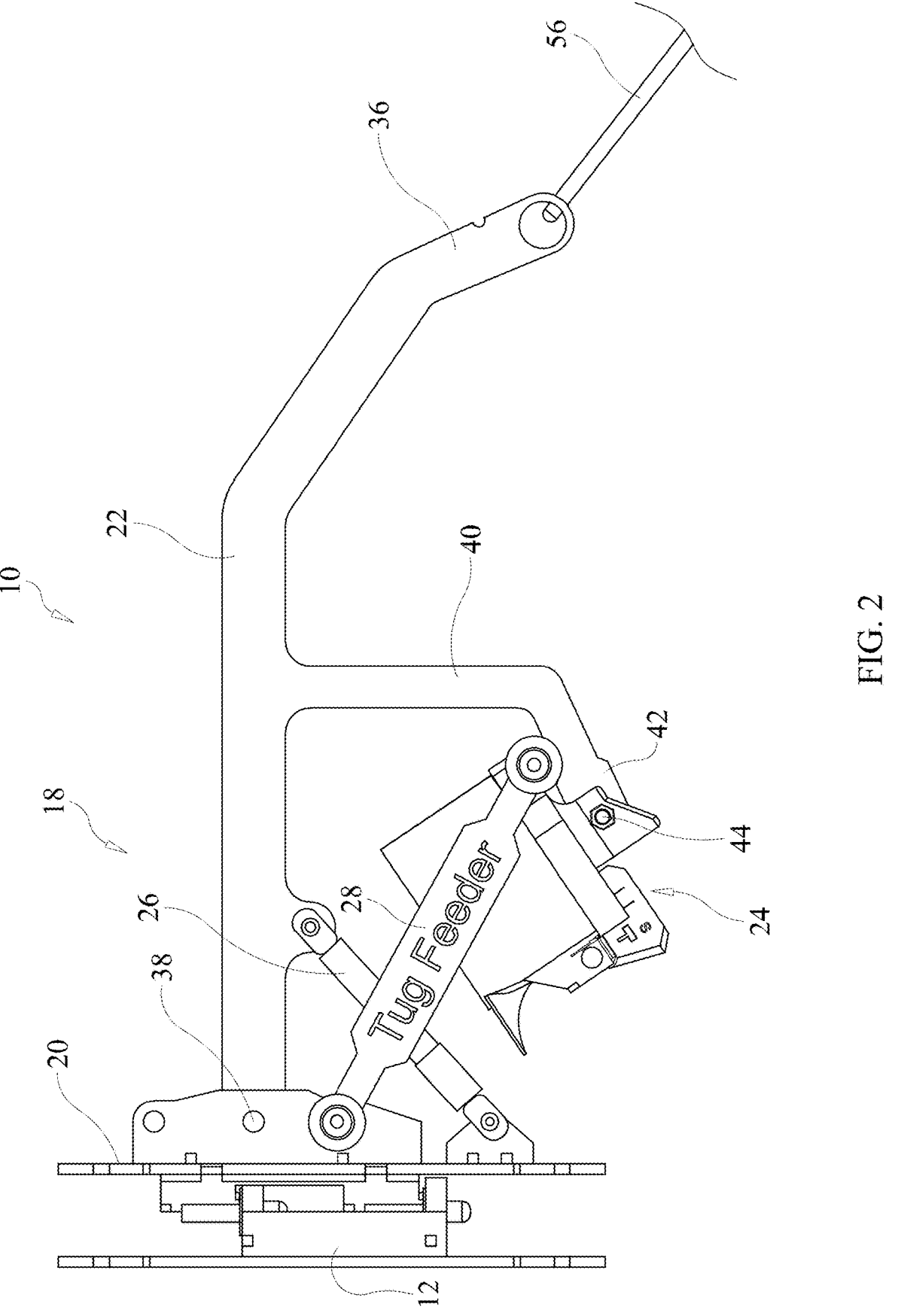
FIG. 2 illustrates a side view of a mechanical dog tug apparatus in a tugged position, according to an aspect of the present disclosure.

With further reference to FIG. 2, apparatus 10 is shown in a tugged position wherein tug rope 56 is pulled and in tension, causing the tug arm to pivot around axis 38. As further seen, in the tugged position, the jar assembly 24 is partially inverted, having been pivoted about axis 44. The jar assembly 24 pivots about axis 44 to achieve inversion through the linkage formed by the tug arm 22 and the jar arms 28. When tug arm 22 pivots around axis 38, the end 42 of the extension arm 40 follows a rotational arc, moving end 42 toward axis 38. As end 42 approaches axis 38, the fixed length of the jar arms causes the jar assembly to pivot around axis 44, moving it into a partially inverted position as shown.

Figure 3:
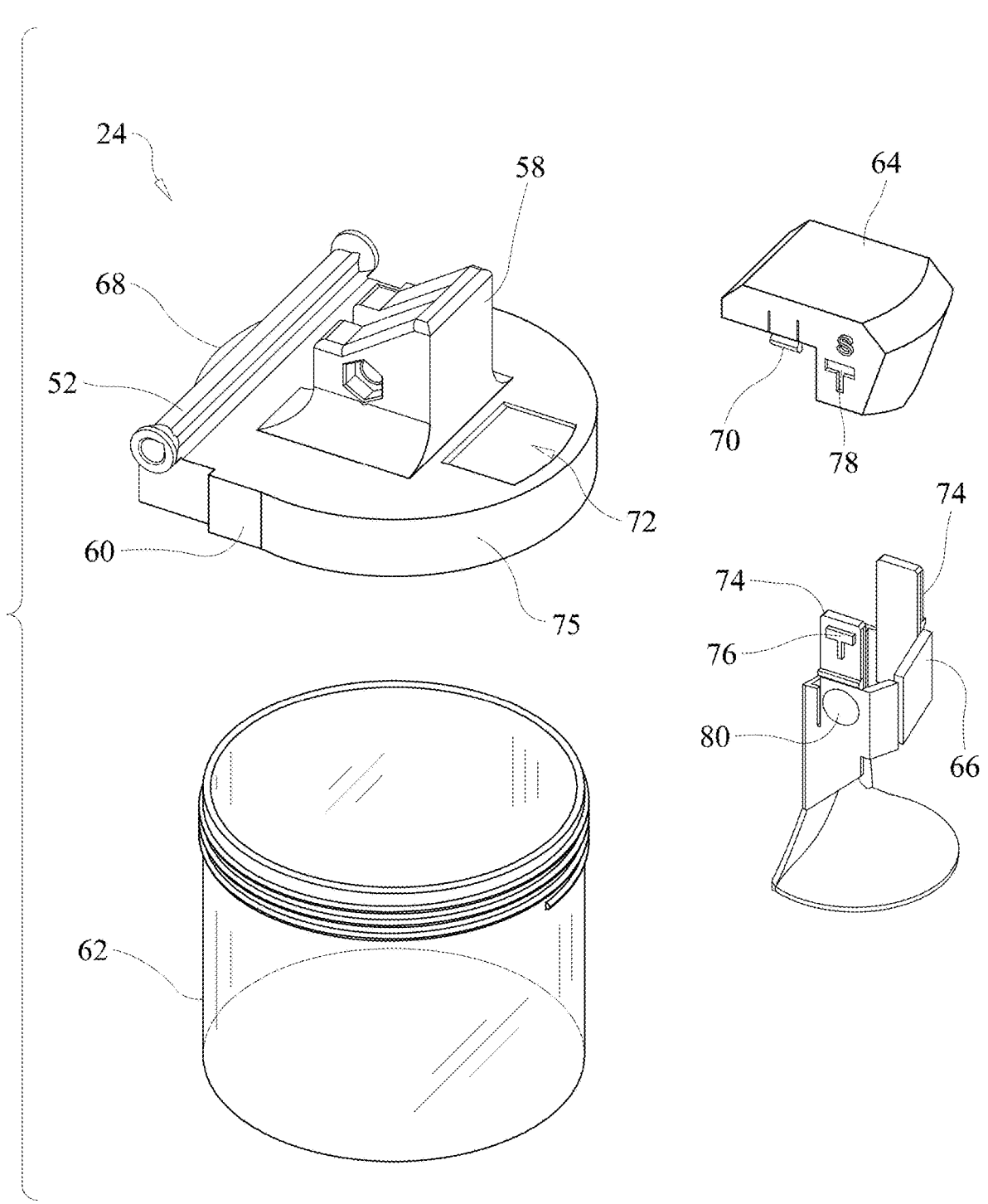
FIG. 3 illustrates a perspective, exploded view of a jar assembly, according to an aspect of the present disclosure.

With further reference to FIG. 3, the jar assembly 24 is shown in an exploded perspective view. The jar assembly has a lid 60, a jar 62, a scoop 64, and a scatter scoop 66. Lid 60 provides the attachment of the jar assembly 24 to the tug arm 22 and the jar arms 28. Particularly, lid 60 has coupling 52 to which the jar arms 28 are attached and coupling 58 to which the end 42 of the extension arm 40 of the tug arm is attached. Lid 60 has a particular orientation in the tug arm assembly 18 with its coupling with the extension arm 40 and the jar arms 28. Coupling 52 is disposed toward an inward-facing side 68 of the lid 60, and coupling 58 is disposed on the lid at an outward position relative to coupling 52, shown here at a central location on the lid.

Jar 62 is threaded to the bottom side of the lid 60. Scoop 64 is attached to the lid 60 by a pair of resilient tabs 70 (only one shown here) on opposite sides of the scoop, which are engaged with opposite edges of aperture 72 that is formed through the lid at a location between coupling 58 and a forward-facing side 75 of the lid. Scatter scoop 66 is attached to scoop 64 by a pair of resilient tabs 74 on opposite sides of the scatter scoop. In the representatively illustrated embodiment, tabs 74 each have a T-shaped raised key feature 76 that corresponds to a T-shaped aperture 78 on each side of the scoop. Features 76 engage with apertures 78 to couple the scatter scoop 66 to the scoop 64. Tabs 74 may each have a finger grip 80 to help a user press the tabs toward one another to connect and disconnect the scatter scoop 66 to scoop 64.

Figure 4:
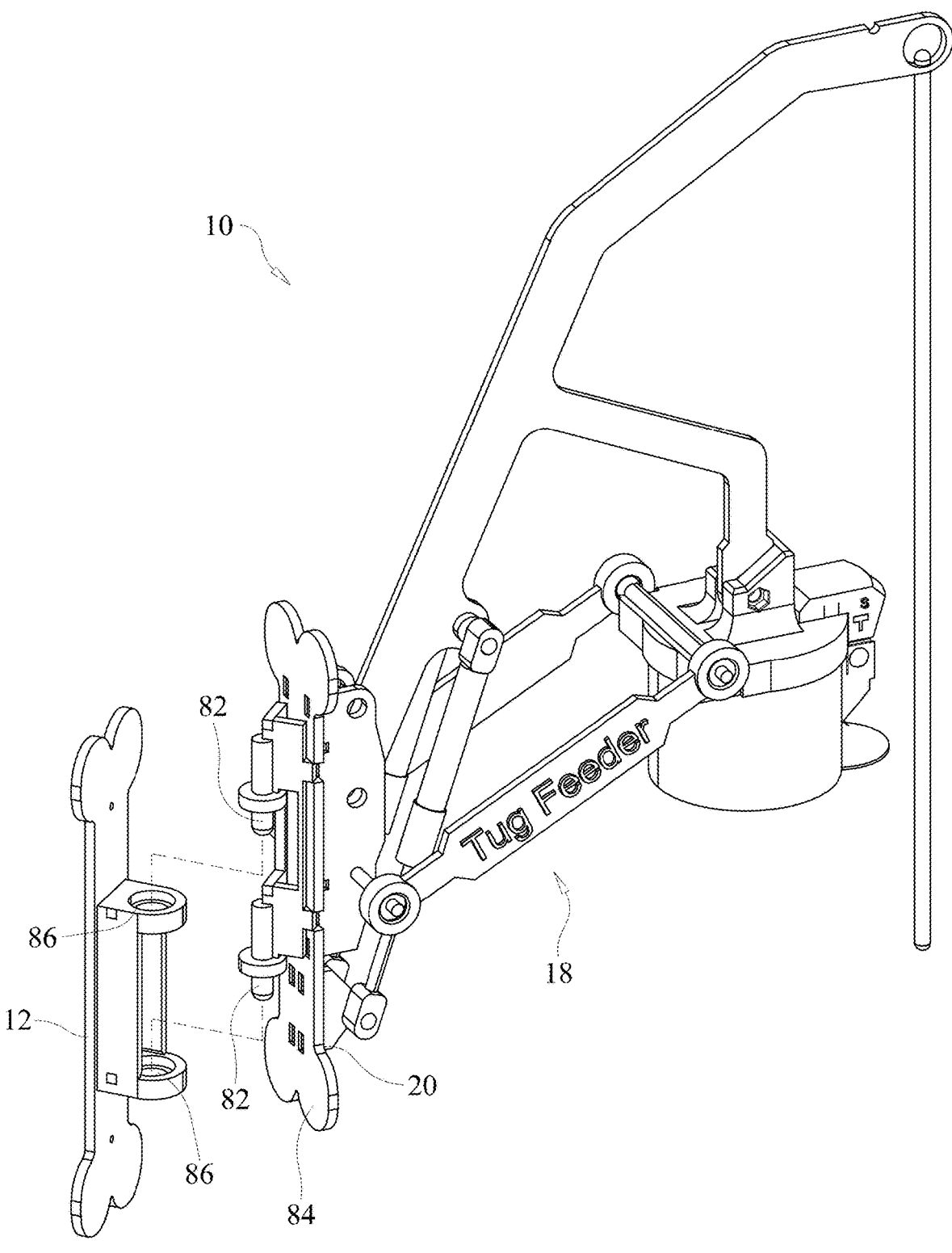
FIG. 4 illustrates a perspective, partial exploded view of a mechanical dog tug apparatus, according to an aspect of the present disclosure.
Figure 5:
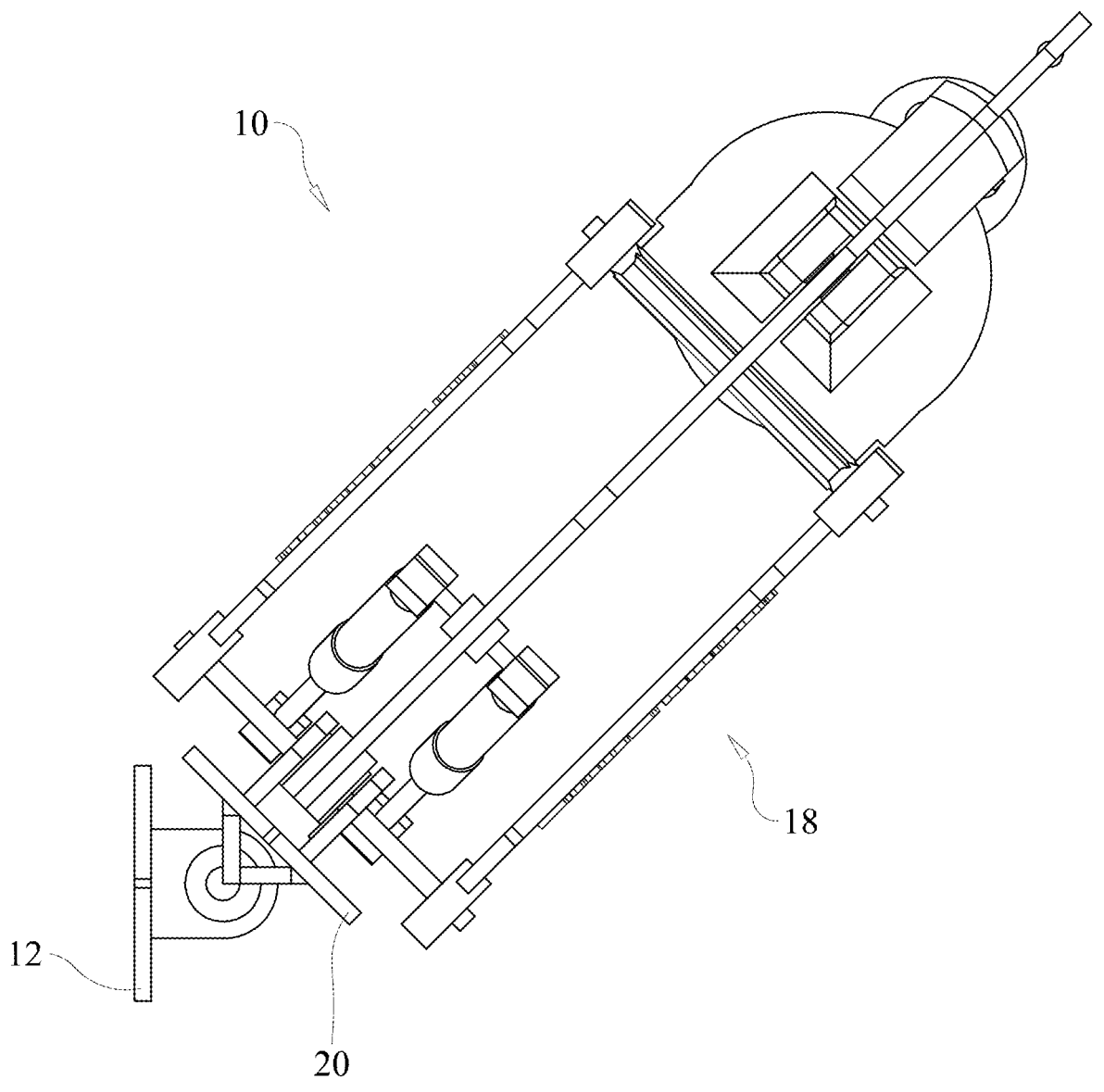
FIG. 5 illustrates a top view of a mechanical dog tug apparatus, according to an aspect of the present disclosure.

With further reference to FIG. 4, in embodiments, the tug assembly 18 can be detachably connected to the mounting bracket 12. This removable feature allows users to install multiple mounting brackets in different locations and move the tug assembly as needed. The tug assembly 18 is attached to the mounting bracket in the representatively illustrated embodiment through a barrel-hinge-like coupling. This coupling includes pintles 82 on the back side 84 of the support bracket 20, arranged vertically, and corresponding gudgeons 86 on the front side 88 of the mounting bracket 12. To attach the tug assembly 18, the pintles 82 are aligned with the gudgeons 86, and the assembly is lowered to engage them. To detach the tug assembly 18, simply lift it upward, disengaging the pintles from the gudgeons. The barrel-hinge-like coupling between the mounting bracket 12 and the tug assembly 18 may also allow for the tug assembly to pivot left and right about the hinge axis, as shown in FIG. 5.

Figure 6:
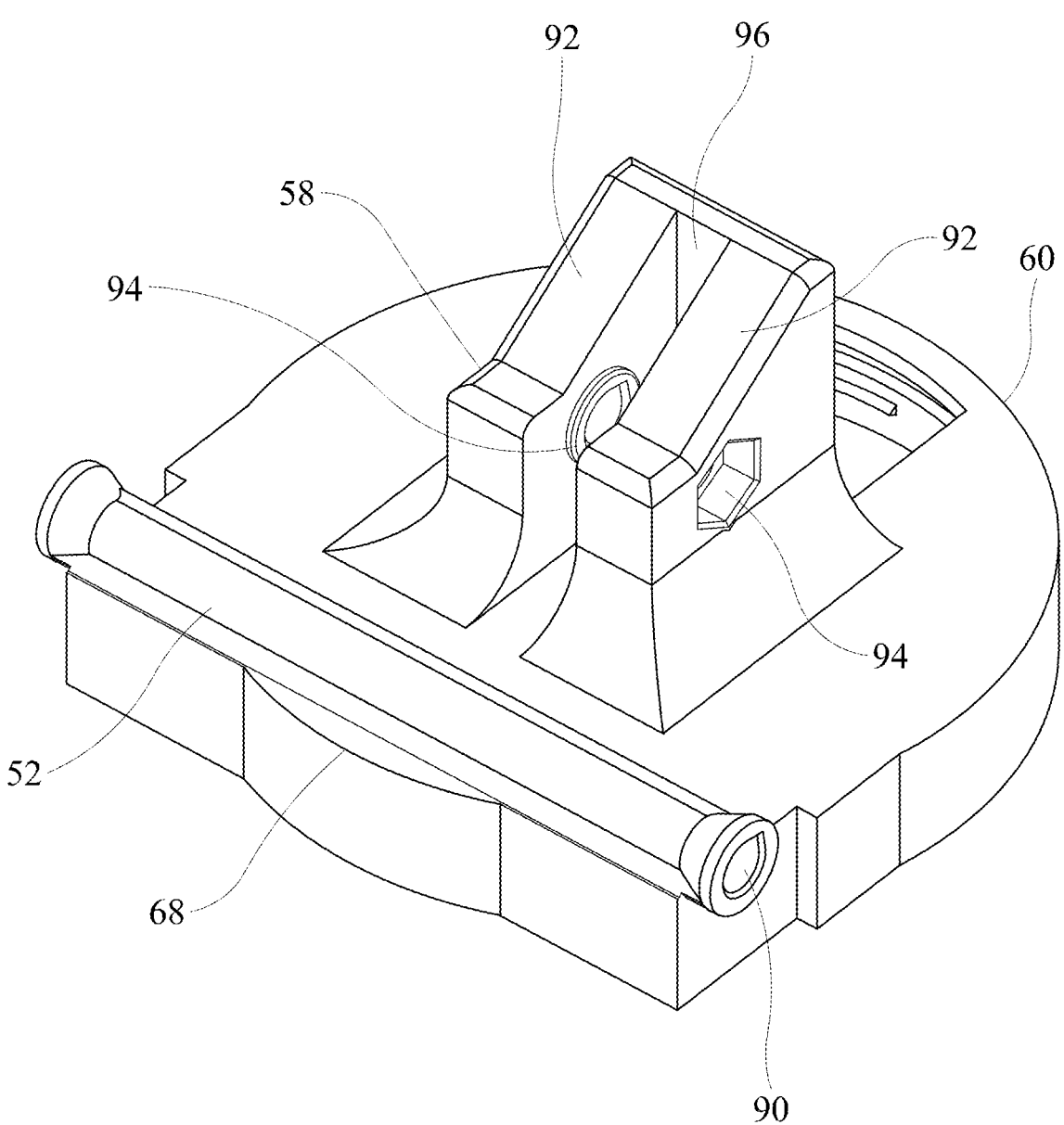
FIG. 6 illustrates a perspective view of a lid, according to an aspect of the present disclosure.

In FIG. 6 there is shown a perspective view of lid 60 according to an embodiment of the invention. Coupling 52, disposed on an inward-facing side 68, may include a through hole 90 through which a threaded faster may be passed and secured for attaching the jar arms on opposite sides of the through hole. As further seen, coupling 58 may be disposed centrally on the lid 60 and may include spaced flanges 92 defining a space 96 therebetween for receiving the end of the extension arm (not seen here). Flanges 92 may have cooperating holes 94 through which a threaded fastener may be inserted and through a corresponding hole in the end of the extension arm for connecting the lid to the tug arm.

Figure 7:
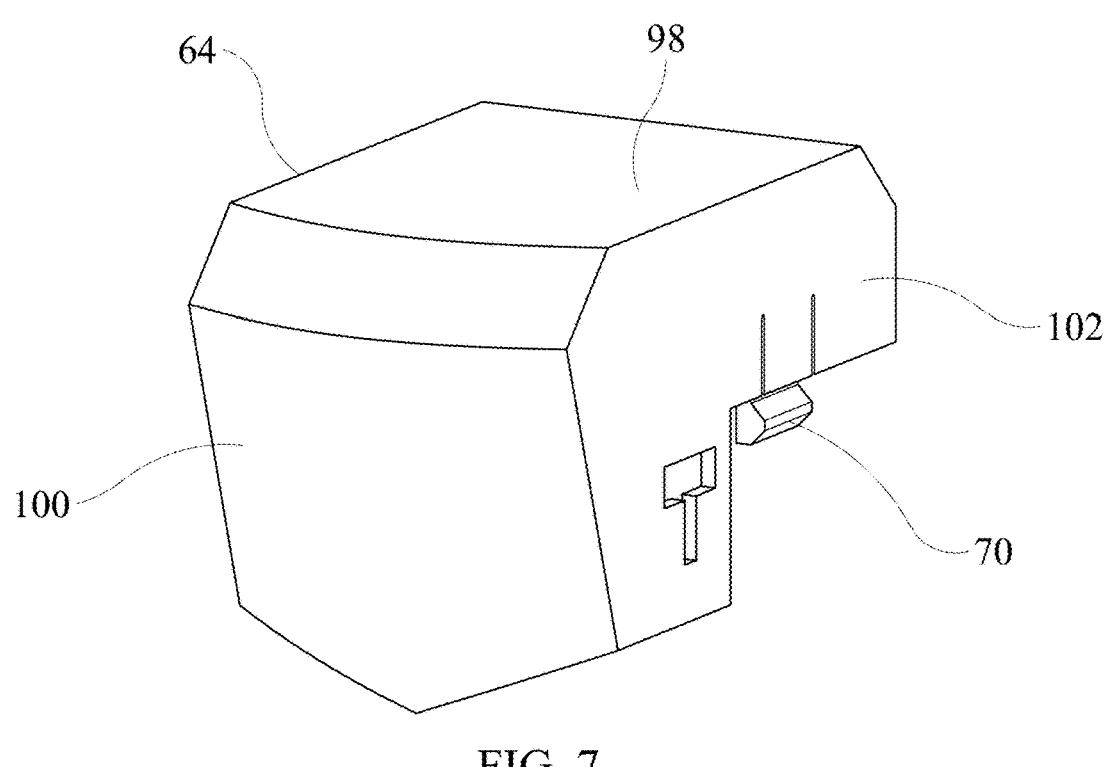
FIG. 7 illustrates a first perspective view of a scoop, according to an aspect of the present disclosure.
Figure 8:
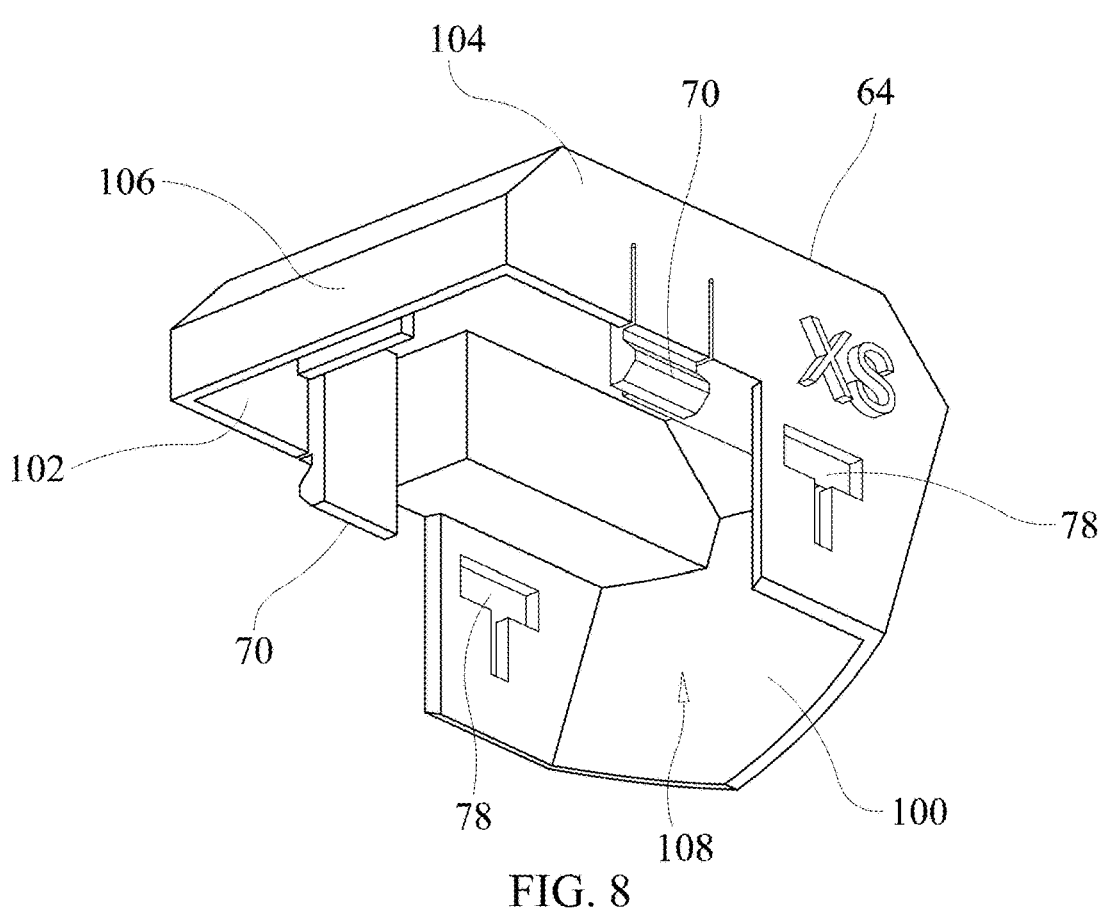
FIG. 8 illustrates a second perspective view of the scoop of FIG. 7, according to an aspect of the present disclosure.

Turning to FIGS. 7 and 8, scoop 64 is generally L-shaped and has a hood-like construction with a top wall 98, a font wall 100, side walls 102 and 104, and a back wall 106, the walls collectively define a space 108 therebetween. Each side wall 102 and 104 has a resilient tab 70 that is configured to engage opposite edges of the aperture formed through the lid for securing the scoop to the lid. Each side wall 102 and 104 further included a keyhole 78, representatively shown here as being T-shaped and configured for engagement with a correspondingly shaped projection on the scatter scoop for attaching the scatter scoop to the scoop.

Figures 9, 10:
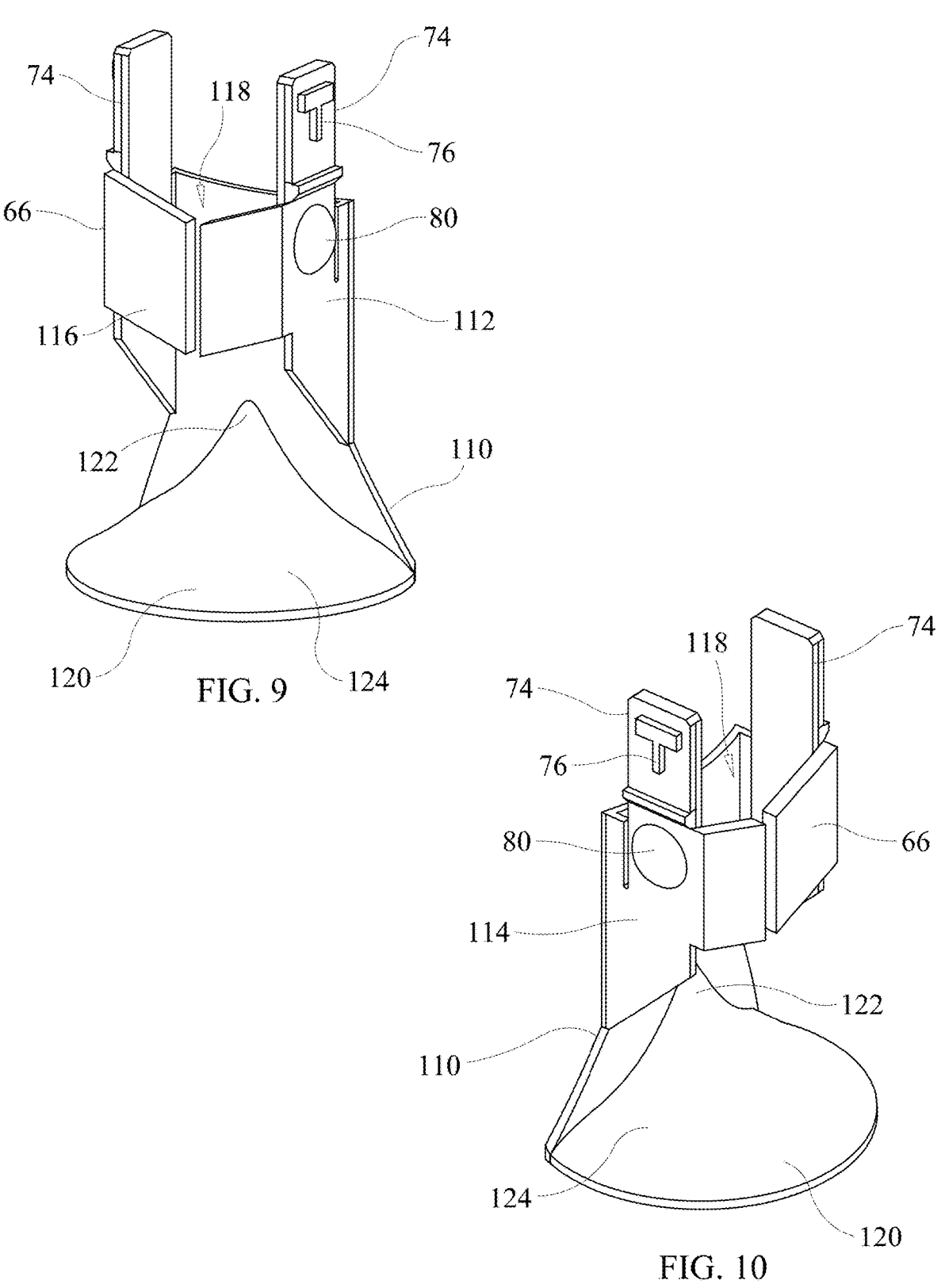
FIG. 9 illustrates a first perspective view of a scatter scoop, according to an aspect of the present disclosure.
FIG. 10 illustrates a second perspective view of the scatter scoop of FIG. 9, according to an aspect of the present disclosure.
Figure 11:
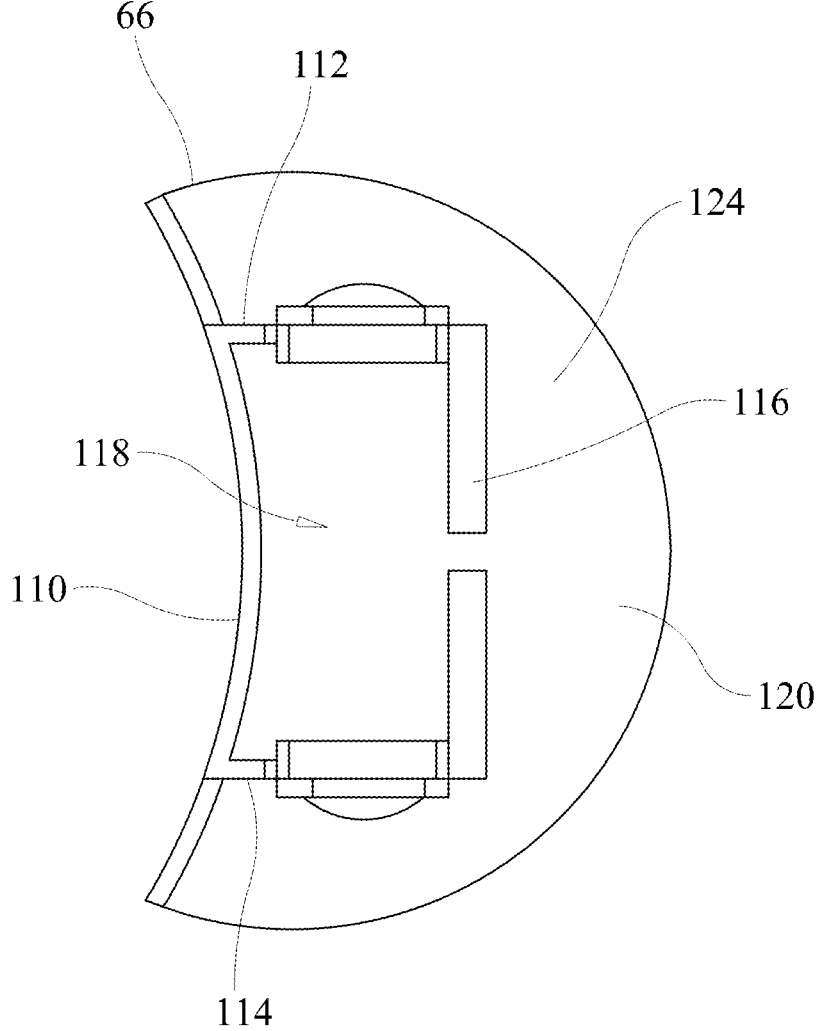
FIG. 11 illustrates a top view of the scatter scoop of FIG. 9, according to an aspect of the present disclosure.

Turning to FIGS. 9-11, scatter scoop 66 has a back wall 110 with a curved surface that is curved to correspond the side of the jar so that when the jar assembly is assembled, the curved surface of the back wall contacts against the side of the jar. Scatter scoop 66 further has side walls 112 and 114 disposed on opposite sides of the back wall 110 and a front wall 116 attached to the side walls opposite the back wall. The back wall, the side walls 112 and 114, and the front wall 116 define a passageway 118. Side walls 112 and 114 may have a tab member 74 that extends upwardly therefrom. Each tab member 74 may have a raised key feature 76, representatively shown as being T-shaped. The key feature 76 is configured for engagement with a corresponding keyhole in the sides of the scoop for securing the scatter scoop to the scoop. Each side wall 112 and 114 may have a finger engagement feature 80, representatively shown as a circular shaped nub, that can be used by a user in attaching the scatter scoop to the scoop by squeezing together the side walls 112 and 114 and/or the tabs 74. The front wall 116 may be split to permit the side walls to move toward one another more easily. The scatter scoop 66 further has a conically shaped surface 120 located at the bottom of the back wall 110. The conically shaped surface 120 is oriented with its apex 122 facing toward passageway 118 and curvature 124 facing outwardly such that objects passing through the passageway will strike the curvature.

Figure 12:
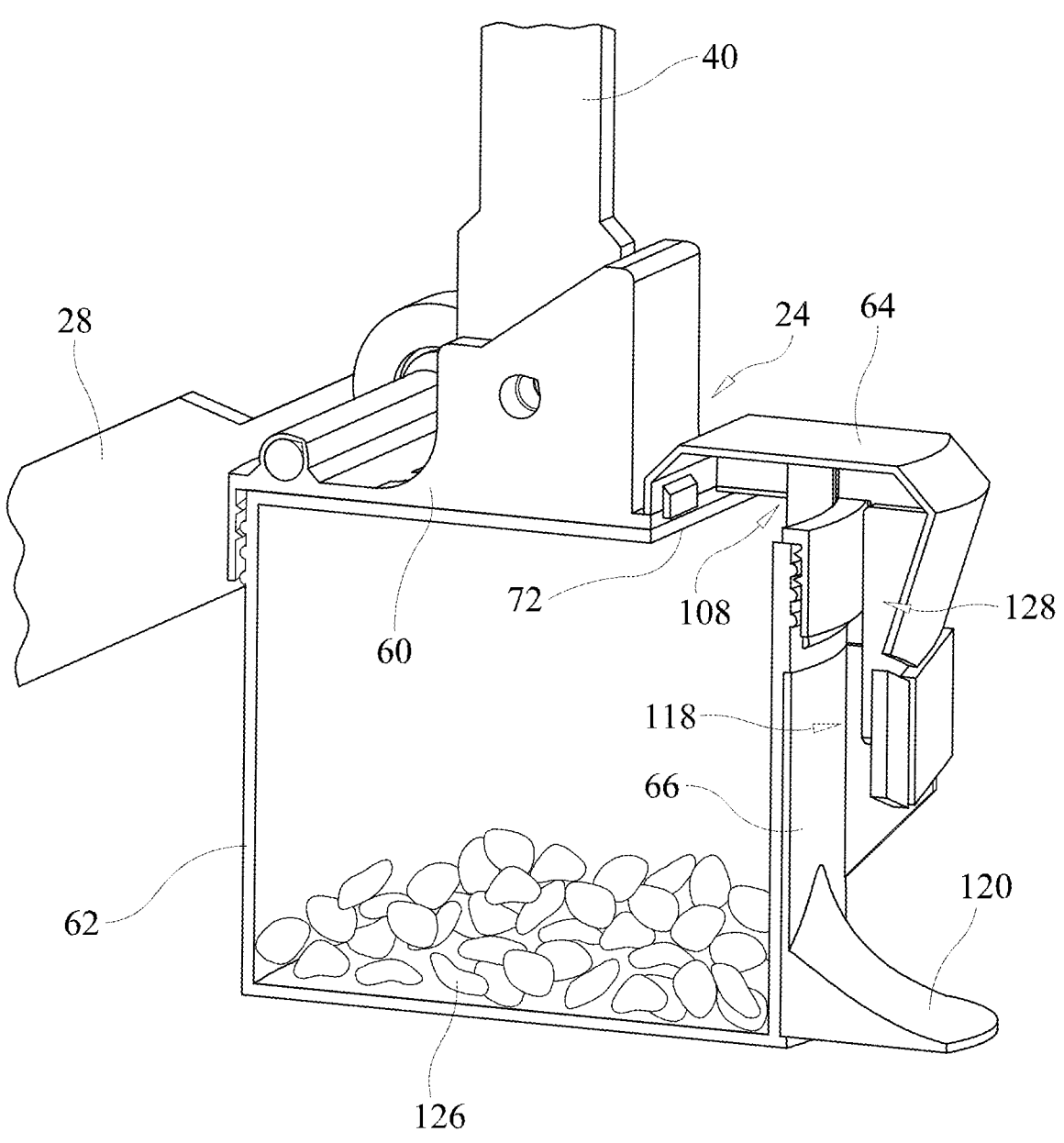
FIG. 12 illustrates a cross-sectional view of a jar assembly in an upright position and holding food items, according to an aspect of the present disclosure.

FIG. 12 is a cross-sectional view of the jar assembly 24 in the resting position (non-tugged position, see FIG. 1) of apparatus 10. As seen here, jar 62 is holding treats 126. Space 108 of scoop 64 and passageway 118 of scatter scoop 66 collectively create chute 128, connected to aperture 72 through lid 60.

Figure 13:
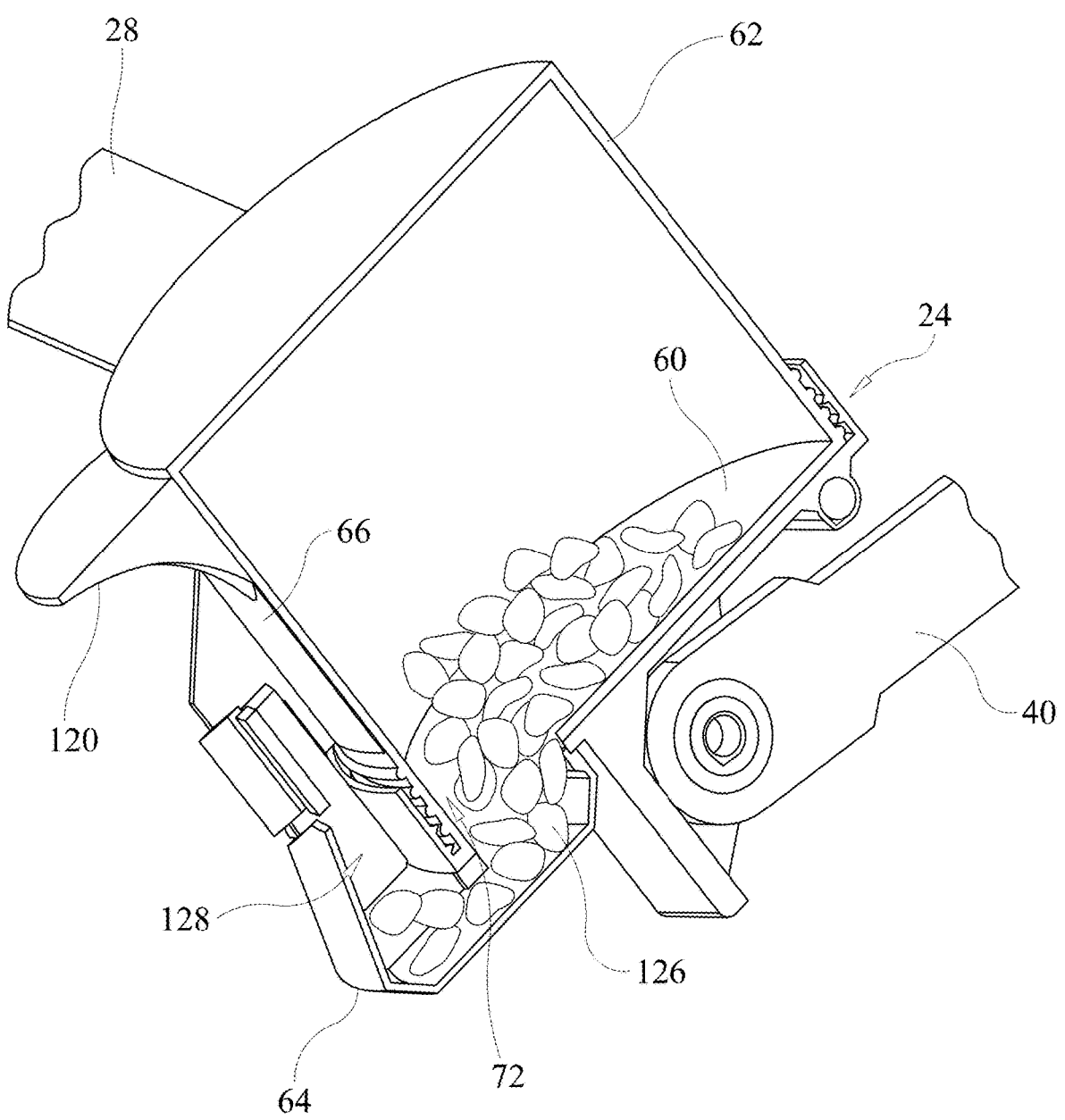
FIG. 13 illustrates a cross-sectional view of the jar assembly of FIG. 12 in a partially inverted position having been moved from the upright position, according to an aspect of the present disclosure.

FIG. 13 is a cross-sectional view of jar assembly 24 having been moved from the resting position (FIG. 12) to the tugged position (see FIG. 2) of apparatus 10, wherein jar assembly 24 is inverted. As seen here, in the inverted position, treats 126 fall through aperture 72 in the lid 60 and are held by scoop 64.

Figure 14:
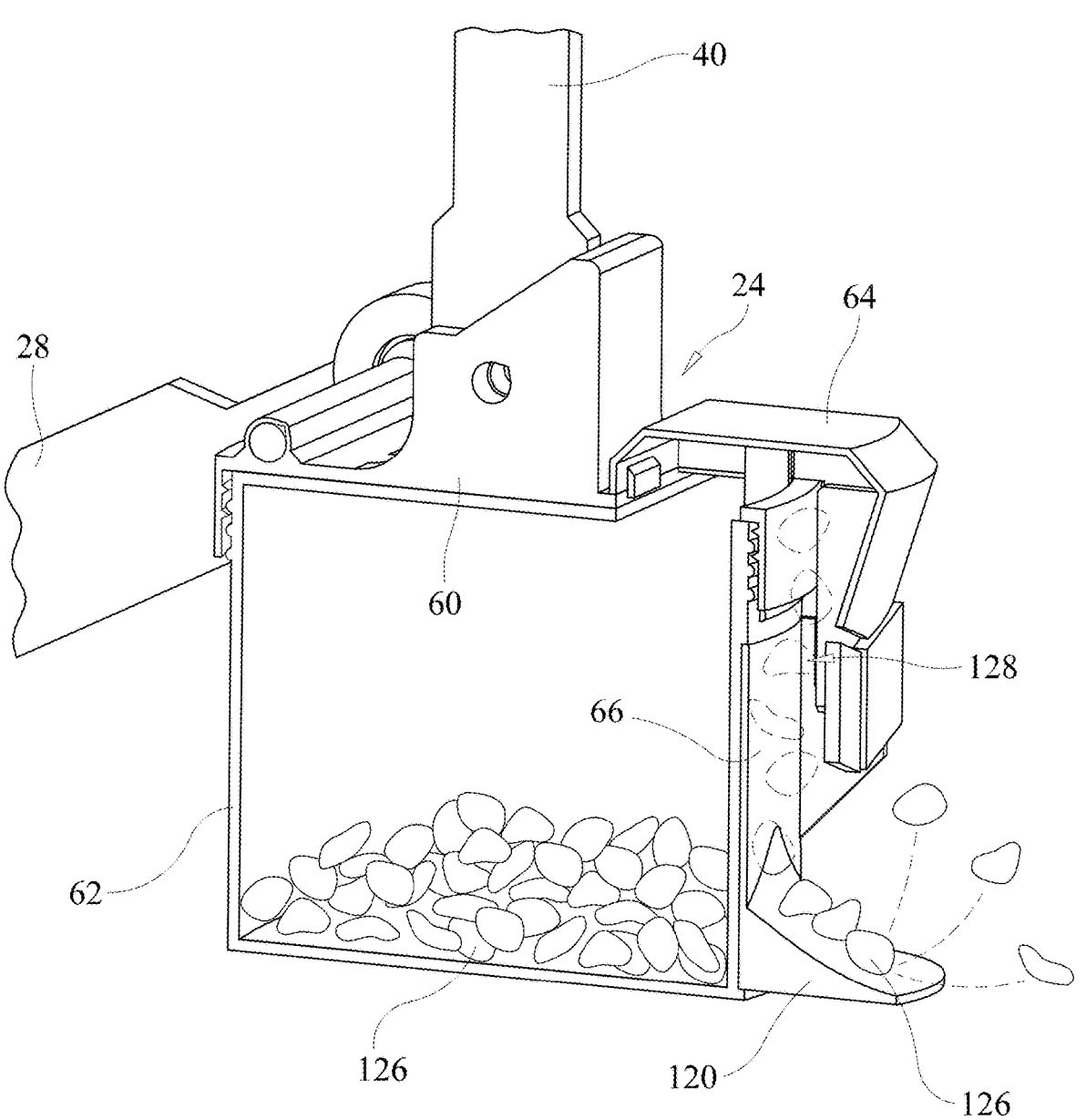
FIG. 14 illustrates a cross-sectional view of the jar assembly of FIG. 13 in an upright position having been moved from the partially inverted position, according to an aspect of the present disclosure.

FIG. 14 is a cross-sectional view of jar assembly 24 having been moved from the tugged position back to resting position. As seen here, as the apparatus moves from the tugged position (FIG. 2) back to the resting position (FIG. 1). The rotational movement of the jar assembly 24 causes the treats 126 that were held by the scoop 64 to flow through chute 128 and hit upon conical surface 120 of the scatter scoop. When treats 126 hit the conical surface 120 as the treats exit chute 128, the treats are caused to randomly fly off from the conical surface and into the surrounding space.

Figure 15:
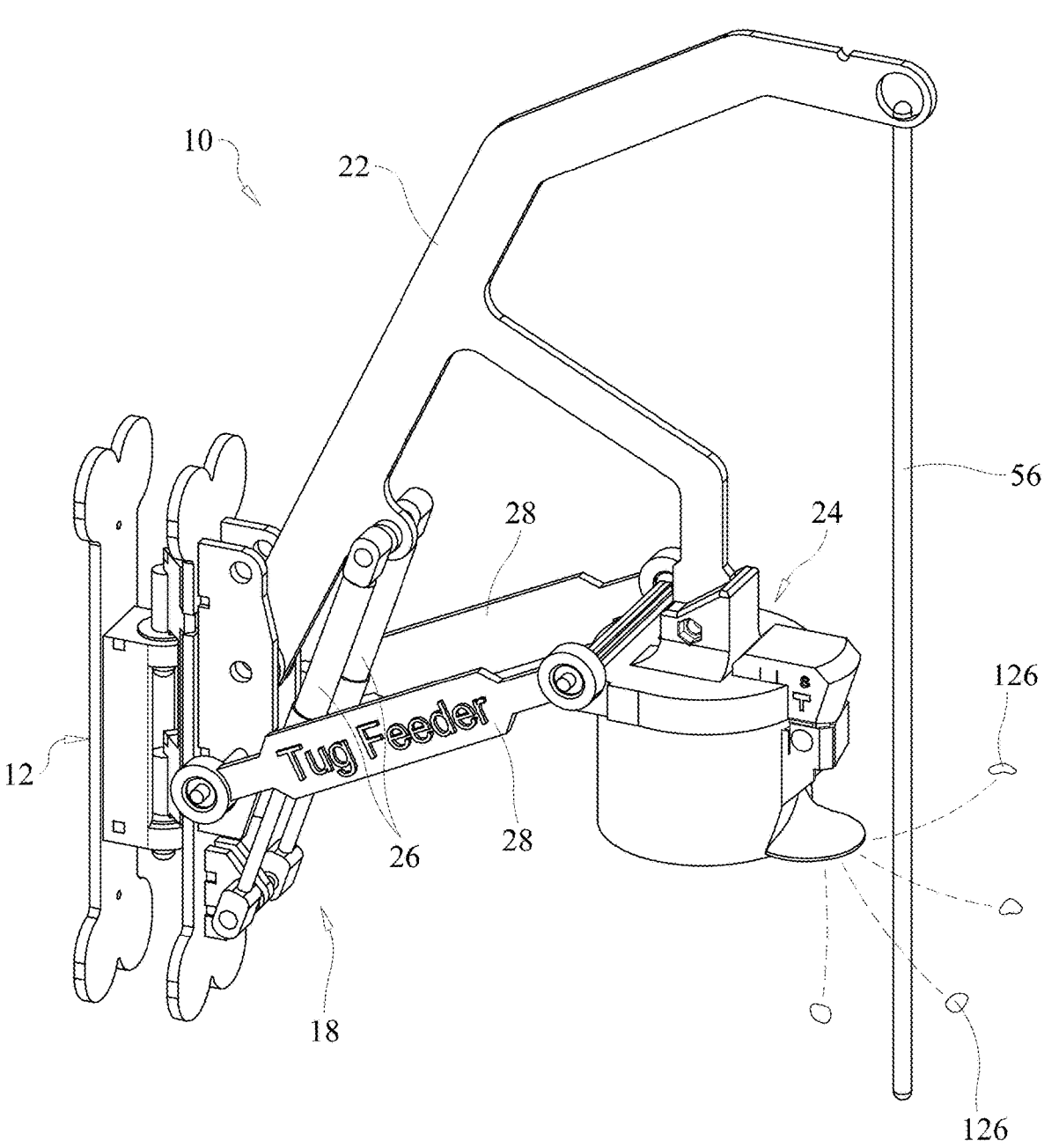
FIG. 15 illustrates a perspective view of a mechanical dog tug apparatus shown dispensing food items into the space surrounding the apparatus, according to an aspect of the present disclosure.

With further reference to FIG. 15, in use, a dog (not shown) would be trained to use its jaws to grab tug rope 56 and tug upon it to move the apparatus from the resting position (FIG. 1) into the tugged positions (FIG. 2) and then release the tug rope. Once the tug rope is released, apparatus 10 moves back into the resting position by the spring force provided by the gas springs. When apparatus moves from the resting position to the tugged position, and then back to the resting position, treats 126 are dispensed as described above in relation to FIGS. 12-14.

Figure 16:
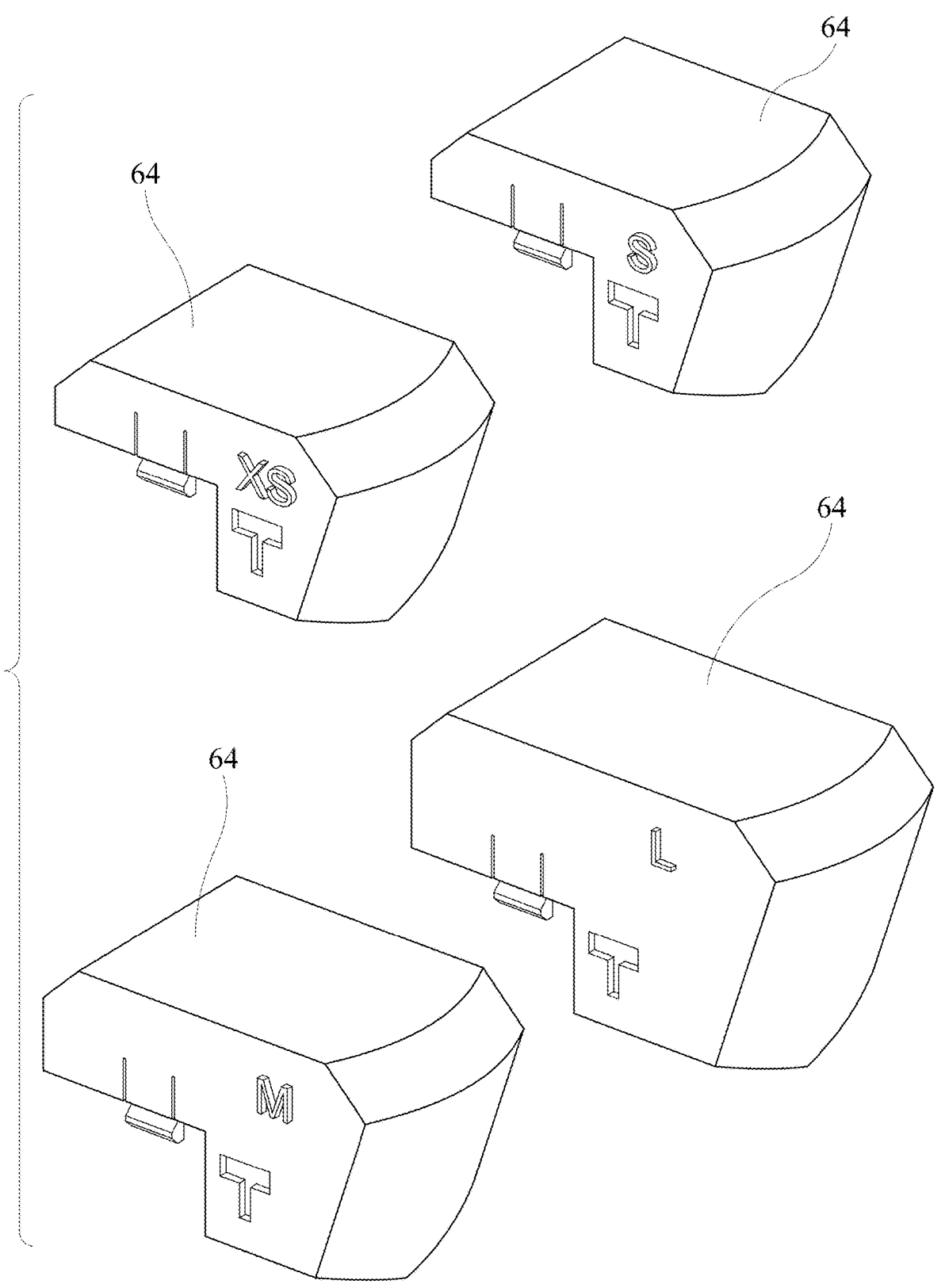
FIG. 16 illustrates a perspective view of several scoops of different sizes, according to an aspect of the present disclosure.

With reference to FIG. 16, in an embodiment, different scoops 64 may be provided each with a different size to be used with treats of a corresponding size or to adjust the amount of treats dispensed during each cycle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A dog tug apparatus, comprising:

a tug assembly, the tug assembly comprising:

a tug arm, the tug arm having a first end, a second end, and a length extending between the first and second ends, the first end supported to pivot around a first axis, the tug arm having an extension arm, wherein the tug arm has resting position in a first rotational location about the first axis and a tugged position in a second rotational location about the first axis;

a jar assembly, the jar assembly is pivotally coupled to the extension arm to pivot relative to the extension arm around a second axis;

a linkage connected to the jar assembly; and wherein rotation of the tug arm around the first axis from the resting position to the tugged position causes the jar assembly to rotate about the second axis relative to the extension arm from an upright position to an at least partially inverted position causing food items held by the jar assembly to move into position for dispensing, and wherein rotation of the tug arm around the first axis from the tugged position back to the resting position causes the jar assembly to rotate back into the upright position, and wherein the motion of the jar assembly rotating from the at least partially inverted position to the upright position dispenses the food items that were moved in position for dispensing.

2. The dog tug apparatus of claim 1, further comprising:

a mounting bracket; and the tug assembly further having a support bracket, and the support bracket being connected to the mounting bracket.

3. The dog tug apparatus of claim 2, wherein the support bracket is removably connected to the mounting bracket.

4. The dog tug apparatus of claim 3, wherein the support bracket has one or more pintles and the mounting bracket has a corresponding one or more gudgeons, and wherein the one or more pintles are removably receivable by the one or more gudgeons to removably connect the support bracket to the mounting bracket.

5. The dog tug apparatus of claim 4, wherein when the support bracket is connected to the mounting bracket, the support bracket is pivotal relative to the mounting bracket.

6. The dog tug apparatus of claim 2, wherein the linkage has one or more jar arms each jar arm having a first end coupled to the support bracket to pivot relative to the support bracket and a second end coupled to the jar assembly to pivot relative to the jar assembly.

7. The dog tug apparatus of claim 1, wherein:

the jar assembly has a jar lid, a jar, a scoop, and a scatter scoop;

the jar lid being coupled to the extension arm and being coupled to the linkage;

the jar being removably connected to the jar lid;

the scoop being connected to the jar lid at an aperture through the jar lid;

the scatter scoop being connected to the scoop; and the scoop and the scatter scoop defining a channel that is connected at one end to the aperture and that is open at an opposite end.

8. The dog tug apparatus of claim 7, wherein the scatter scoop has a conically shaped surface having an apex and the conically shaped surface being disposed near the opposite end of the channel with the apex of the conically shaped surface facing the opposite end of the channel.

9. A dog tug apparatus, comprising:

a tug assembly, the tug assembly comprising:

a support bracket;

a tug arm, the tug arm having a first end, a second end, and a length extending between the first and second ends, the first end coupled to the support bracket to pivot relative to the support bracket around a first axis, the tug arm having an extension arm, wherein the tug arm has resting position in a first rotational location about the first axis and a tugged position in a second rotational location about the first axis;

a jar assembly, the jar assembly is pivotally coupled to the extension arm to pivot relative to the extension arm around a second axis;

one or more jar arms, each jar arm having a first end coupled to the support bracket to pivot relative to the support bracket and a second end coupled to the jar assembly to pivot relative to the jar assembly;

one or more gas springs, each gas spring having a first end coupled to the support bracket to pivot relative to the support bracket and a second end coupled to the tug arm to pivot relative to the tug arm; and a tug rope attached to the second end of the tug arm, and wherein pulling on the tug rope rotates the tug arm from the resting position into the tugged position.

10. The dog tug apparatus of claim 9, wherein rotation of the tug arm around the first axis from the resting position to the tugged position causes the jar assembly to rotate about the second axis from an upright position to an at least partially inverted position causing food items held by the jar assembly to move into position for dispensing, and wherein rotation of the tug arm around the first axis from the tugged position back to the resting position causes the jar assembly to rotate back into the upright position, and wherein the motion of the jar assembly rotating from the at least partially inverted position to the upright position dispenses the food items that were moved in position for dispensing.

11. The dog tug apparatus of claim 9, further comprising:

a mounting bracket, and wherein the support bracket is removably connected to the mounting bracket.

12. The dog tug apparatus of claim 11, wherein the support bracket has one or more pintles and the mounting bracket has a corresponding one or more gudgeons, and wherein the one or more pintles are removably receivable by the one or more gudgeons to removably connect the support bracket to the mounting bracket.

13. The dog tug apparatus of claim 12, wherein when the support bracket is connected to the mounting bracket, the support bracket is pivotal relative to the mounting bracket.

14. The dog tug apparatus of claim 9, wherein:

the jar assembly has a jar lid, a jar, a scoop, and a scatter scoop;

the jar lid being coupled to the extension arm and being coupled to the linkage;

the jar being removably connected to the jar lid;

the scoop being connected to the jar lid at an aperture through the jar lid;

the scatter scoop being connected to the scoop; and the scoop and the scatter scoop defining a channel that is connected at one end to the aperture and that is open at is an opposite end.

15. The dog tug apparatus of claim 14, wherein the scatter scoop has a conically shaped surface having an apex and the conically shaped surface being disposed near the opposite end of the channel with the apex of the conically shaped surface facing the opposite end of the channel.

16. A dog tug apparatus, comprising:

mounting bracket;

a tug assembly, the tug assembly comprising:

a support bracket;

a tug arm, the tug arm having a first end, a second end, and a length extending between the first and second ends, the first end coupled to the support bracket to pivot relative to the support bracket around a first axis, the tug arm having an extension arm, wherein the tug arm has resting position in a first rotational location about the first axis and a tugged position in a second rotational location about the first axis;

a jar assembly, the jar assembly is pivotally coupled to the extension arm to pivot relative to the extension arm around a second axis;

the jar assembly has a jar lid, a jar, a scoop, and a scatter scoop;

the jar lid being coupled to the extension arm;

the jar being removably connected to the jar lid;

the scoop being connected to the jar lid at an aperture through the jar lid;

the scatter scoop being connected to the scoop;

the scoop and the scatter scoop defining a channel that is connected at one end to the aperture and that is open at an opposite end;

one or more jar arms, each jar arm having a first end coupled to the support bracket to pivot relative to the support bracket and a second end coupled to the jar lid to pivot relative to the jar assembly;

one or more gas springs, each gas spring having a first end coupled to the support bracket to pivot relative to the support bracket and a second end coupled to the tug arm to pivot relative to the tug arm;

a tug rope attached to the second end of the tug arm, and wherein pulling on the tug rope rotates the tug arm from the resting position into the tugged position;

the support bracket being connected to the mounting bracket; and wherein rotation of the tug arm around the first axis from the resting position to the tugged position causes the jar assembly to rotate about the second axis relative to the extension arm from an upright position to an at least partially inverted position causing food items held by the jar assembly to move into position for dispensing, and wherein rotation of the tug arm around the first axis from the tugged position back to the resting position causes the jar assembly to rotate back into the upright position, and wherein the motion of the jar assembly rotating from the at least partially inverted position to the upright position dispenses the food items that were moved in position for dispensing.

17. The dog tug apparatus of claim 16, wherein the scatter scoop has a conically shaped surface having an apex and the conically shaped surface being disposed near the opposite end of the channel with the apex of the conically shaped surface facing the opposite end of the channel.

18. The dog tug apparatus of claim 16, wherein the support bracket has one or more pintles and the mounting bracket has a corresponding one or more gudgeons, and wherein the one or more pintles are removably receivable by the one or more gudgeons to removably connect the support bracket to the mounting bracket.

* * * * *